United States Patent
Khan

(10) Patent No.: US 7,177,414 B1
(45) Date of Patent: Feb. 13, 2007

(54) CALL FORWARDING BASED ON DETERMINATION OF STATUS OF DESTINATION

(75) Inventor: Azhar I. Khan, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 585 days.

(21) Appl. No.: 10/246,185

(22) Filed: Sep. 17, 2002

(51) Int. Cl.
    *H04M 3/42* (2006.01)
(52) U.S. Cl. .............................. 379/211.02; 379/212.01
(58) Field of Classification Search ........... 379/211.02, 379/212.01, 221.08; 455/461
See application file for complete search history.

(56) References Cited

U.S. PATENT DOCUMENTS

| | | | |
|---|---|---|---|
| 4,723,273 A * | 2/1988 | Diesel et al. .......... | 379/211.02 |
| 5,530,931 A * | 6/1996 | Cook-Hellberg et al. .................... | 379/211.03 |
| 6,134,314 A * | 10/2000 | Dougherty et al. .... | 379/201.01 |
| 6,754,325 B1 * | 6/2004 | Silver et al. ........... | 379/211.02 |
| 2002/0111176 A1 * | 8/2002 | Roeder ...................... | 455/466 |
| 2002/0176379 A1 * | 11/2002 | Wallenius et al. .......... | 370/328 |
| 2005/0195957 A1 * | 9/2005 | Gibson | |

OTHER PUBLICATIONS

WAP Architecture, Version 12—Jul. 2001: Wireless Application Protocol Architecture Specification WAP-210-WAPArch-20010712, copyright 2000-2001.

* cited by examiner

*Primary Examiner*—William J. Deane, Jr.
(74) *Attorney, Agent, or Firm*—Lee & Hayes, PLLC

(57) ABSTRACT

In a call forwarding system, a call from a calling party for a called party is received at a switching device and in response to the received call the switching device issues a request for call processing instructions to a control device. The call processing instructions request is received at the control device and in response to the received request the control device checks with the destination station to determine the availability thereof. The control device returns call processing instructions to the switching device including a telephone number of the destination station if the destination station is available. Similarly, the control device returns alternative call processing instructions to the switching device if the destination station is not available.

20 Claims, 4 Drawing Sheets

CALL FORWARDING BASED ON DETERMINATION OF STATUS OF DESTINATION

FIELD OF THE INVENTION

The present invention relates to a telephone system that forwards a call to a destination based on the status of the destination. More particularly, the present invention relates to such a system that determines the status of the destination without excessively tying up system resources.

BACKGROUND OF THE INVENTION

In recent years, a number of new telephone service features have been provided by an Advanced Intelligent Network (AIN). The AIN evolved out of a need to increase the capabilities of the telephone network architecture in order to meet the growing needs of telephone customers or users. Additionally, as the number of people who rely on the Internet for communication increases, so too does the demand for the electronic transfer of data.

Referring now to FIG. 1, it is seen that an AIN-based network arrangement is provided within and/or in conjunction with a wire line telephone system LATA (Local Access and Transport Area) 101 that defines a calling service area. Note that a similar arrangement is also provided with and/or in conjunction with a wireless telephone system. Each LATA 101 (only one being shown in FIG. 1) includes stations (i.e., telephone lines and telephone equipment at the respective ends thereof) 103 and corresponding service switching points (SSPs) 105 (i.e., end offices or central offices). The SSPs 105 are each programmable switches which: recognize AIN-type calls; launch queries to service control points (SCPs) 107 (only one being shown in FIG. 1); and receive commands and data from SCPs 107 to further process and route AIN-type calls. A signal transfer point (STP) 109 may be employed to route signals between the SSPs 105, the SCPs 107, and other network elements. When one of the SSPs 105 is triggered by an AIN-type call, the triggered SSP 105 formulates an AIN service request and responds to call processing instructions from the network element in which the AIN service logic resides, typically at an SCP 107.

One type of event that may be arranged to set off an AIN trigger in an SSP 105 or the like is a call from a calling party to a called party where the called party subscribes to a call forwarding service. Accordingly, the AIN trigger at issue is associated with the called party and with the SSP 105 of such called party. In response to the set-off trigger, the SSP 105 determines from the SCP 107 whether the call forwarding service has been actuated by the called party and if so routing instructions for forwarding the call as has already been arranged by the called party.

In one form of the aforementioned call forwarding service, the called party can set the call from the calling party to be forwarded from a wire line (i.e. land line) station to a wireless (i.e., mobile or cellular) station. More generally, though, the call forwarding service can encompass forwarding the call from the calling party from a wire line or wireless station to another wire line or wireless station.

In any case, the call forwarding service works such that when a calling party calls a service-subscribing called party, and assuming the service is actuated, the corresponding AIN trigger or the like is set off, the triggered SSP 105 or the like formulates and sends a service request to an SCP 107 or the like, and receives from the SCP 107 call processing instructions including a telephone number of a destination station to which the call is to be forwarded.

The SSP 105 then in fact forwards the call to the destination station, but must wait to see if the destination station is on (if a mobile or cellular station, e.g.), and to see if the call is in fact answered at such destination station. As may be appreciated, such waiting is costly in that multiple circuits may be continuously employed for the duration of the forwarding. In one scenario, for example, a calling party calls a service-subscribing called party at a wire line station, the call is routed to the SSP 105 of the called party where the AIN forwarding service trigger is set-off, the triggered SSP 105 formulates and sends the service request to the SCP 107, the SCP 107 determines that the called party has turned on the service and has set a particular wireless station as the destination station, the SCP 107 sends appropriate call processing instructions including a telephone number of the destination station to the SSP 105, and the SSP 105 forwards the call to the destination station.

Now, if it is the case in the scenario that the destination station is not on, is busy, or otherwise cannot answer the forwarded call, the call may then be forwarded back to the SSP 105 for further processing, such as for example forwarding the call to the originally called wire line station or a voice mail system. Plainly, such circuitous routing of the call employs many telephone network resources over an extended period of time.

Accordingly, a need exists for a system that forwards a call based on a determination beforehand of the status of the destination station. More particularly, a need exists for such a system that first determines whether the destination station is available, and only if so in fact forwards the call to such destination station. Thus, circuitous and costly routing of a call is avoided in the event the destination station is not available to answer the call.

SUMMARY OF THE INVENTION

The present invention satisfies the aforementioned need by providing a system and method for processing a call from a calling party to a called party subscribing to a call forwarding system, where the called party wishes to have the call forwarded to a destination station. In the call forwarding system, the call from the calling party is received at a switching device and in response to the received call the switching device issues a request for call processing instructions to a control device. The call processing instructions request is received at the control device and in response to the received request the control device checks with the destination station to determine the availability thereof.

The control device returns call processing instructions to the switching device including a telephone number of the destination station if the destination station is available. Similarly, the control device returns alternative call processing instructions to the switching device if the destination station is not available.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
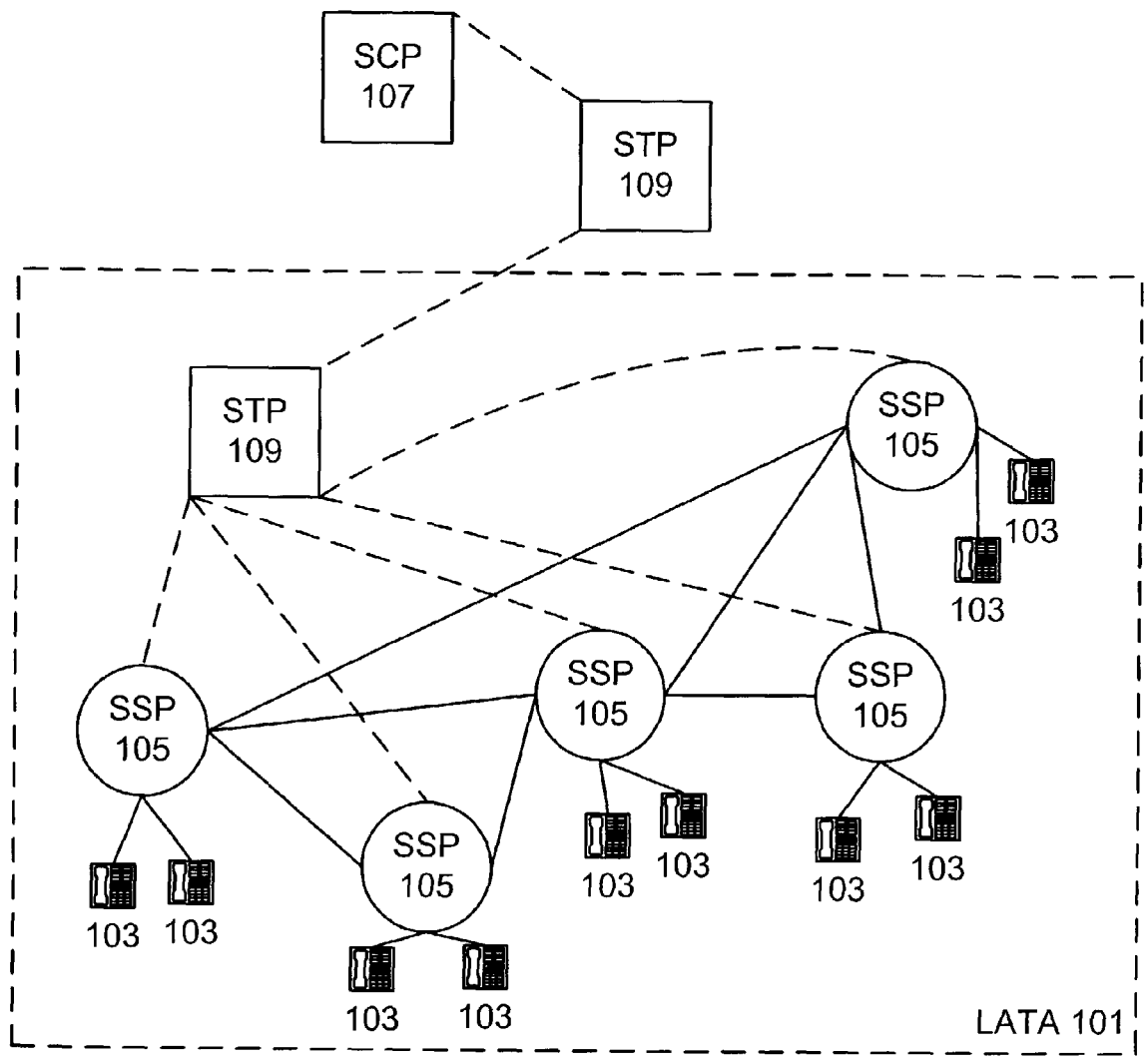
FIG. 1 is a block diagram showing a typical AIN-based telephone network such as may be employed in connection with the present invention.
Figure 2:
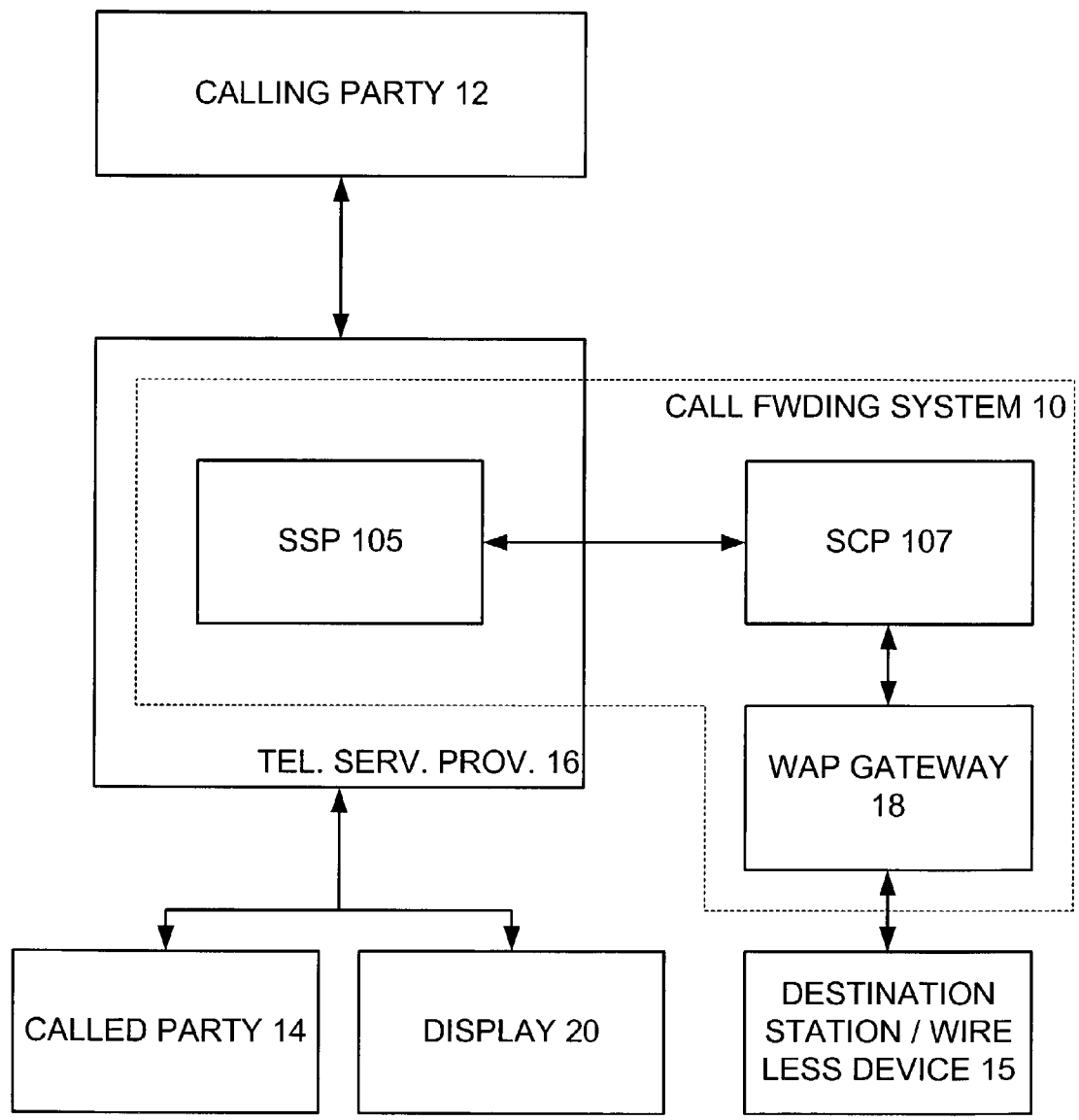
FIG. 2 is a block diagram showing a calling party calling a called party by way of a telephone service provider of the called party, where the called party subscribes to a call forwarding service system in accordance with one embodiment of the present invention.

Referring to the drawings in detail, wherein like numerals are used to indicate like elements throughout, there is shown in FIG. 2 a call forwarding system 10 for providing a call forwarding service that, when actuated, forwards a call from a calling party 12 to a called party 14 to a destination station 15. Typically, the called party 12 determines when the system 10 is actuated therefor, and also determines the destination station 15, which may be wire line or wireless station or the like.

Also typically, the call forwarding system 10 is implemented as a service to the called party 14 by the telephone service provider 16 of the called party 14, and is at least partially implemented at an SSP 105 or central office administered by the telephone service provider 16 and an SCP 107. The call forwarding system 10 may be AIN-based or non-AIN based without departing from the spirit and scope of the present invention.

As was set forth above, the call forwarding system 10 heretofore forwarded a call to the destination station 15 based on a corresponding AIN trigger or the like being set off, followed by a service request from an SSP 105 to an SCP 107 which results in call processing instructions from the SCP 107 to the SSP 105 including a telephone number of the destination station 15. However, and significantly, the SSP 105 after forwarding the call to the destination station must wait to see if the destination station 15 is on (if a mobile or cellular station, e.g.), and to see if the call is in fact answered at such destination station 15, and must also wait in the event that the call is not answered at the destination station 15 and instead 'bounces' back for further processing, such as for example forwarding the call to the called party 14 or a voice mail system. Again, such waiting is costly in that multiple circuits and other resources may be continuously employed over an extended period of time for the duration of the forwarding.

Accordingly, in one embodiment of the present invention, the call forwarding system 10 is modified such that the SCP 107 prior to returning call processing instructions to the SSP 105 checks with the destination station 15 to determine the availability thereof. In particular, the SCP 107 at a minimum checks to determine whether the destination station 15 is on (if a mobile or cellular station, e.g.) and if so whether the destination station 15 is busy. In addition, the SCP 107 may determine whether the destination station 15 is being answered, perhaps by actually signaling the destination station 15 and waiting for an answer, and whether the answering party wishes to receive the forwarded call, perhaps by an appropriate query and response.

In one embodiment of the present invention, and in the case where the forwarded-to destination station 15 is a mobile or cellular station or the like, the SCP 107 accesses the destination station 15 by way of Wireless Application Protocol (WAP) signaling, wireless data, and network technology such as Internet technology. Of course, the SCP 107 may also use alternate signaling technology without departing from the spirit and scope of the present invention, such as may be necessary in the case where the forwarded-to destination station 15 is a wire line station or the like.

As may be appreciated, to employ WAP signaling, the destination station 15 should be a wireless device 15 that is WAP-enabled. Accordingly, and as seen in FIG. 2, the SCP 107 contacts the WAP-enabled device 15 by way of a WAP gateway 18 on a network such as the Internet, where communications between the SCP 107 and the WAP gateway 18 take place according to an appropriate network protocol such as TCP/IP, and where communications between the device 15 and the WAP gateway 18 take place according to WAP signaling. WAP and WAP signaling is known to the relevant public, and further information thereon may be readily obtained from multiple sources, including the Open Mobile Alliance Ltd. of Mountain View, Calif. Accordingly, the specifics of WAP and WAP signaling need not be discussed herein in any detail.

The WAP gateway 18 in response to instructions received from the SCP 107 attempts to establish a data connection with the WAP-enabled device 15. If the data connection is in fact established, the WAP gateway 18 and SCP 107 can conclude that the device 15 is on. With the data connection, the WAP gateway 18 and SCP 107 can also determine whether the destination station 15 is busy, and if so can signal at the device 15 pertinent information to the effect that the forwarding call is available to be answered. In addition, the WAP gateway 18 and SCP 107 can by way of the data connection determine when the device 15 wishes to answer the forwarding call and when the device 15 wishes to reject the forwarding call. Typically, such answering or rejecting occur by way of a selection from options caused to be displayed by the WAP gateway 18 and SCP 107 on a display screen 20 of the device 15.

At any rate, in response to a call answer selection, the SCP 107 is informed of such answer selection by way of the WAP gateway 18 and the SCP 107 then returns call processing instructions to the SSP 105 to the effect that the SSP 105 and the call forwarding system 10 should in fact forward the call to the device 15. Correspondingly, in response to a call rejection selection or a determination that the device 15 is not on, the SCP 107 is informed of such rejection selection or not-on state by way of the WAP gateway 18 and the SCP 107 then returns call processing instructions to the SSP 105 to the effect that the SSP 105 and the call forwarding system 10 should not forward the call to the device 15 but instead should take an alternative action. Such alternative action may be pre-defined and may include forwarding the call to the originally called party 14, a voice mail system, another destination station 15, or the like.

Significantly, the SCP 107 can employ the WAP gateway 18 and WAP signaling to determine the status of the device 15 and to determine whether the call is to be answered at the device 15 prior to attempting any forwarding of the call to such device. Moreover, based on such determinations, the call is efficiently routed to an appropriate ultimate destination with a minimum of use of telephone network resources and without circuitous routing.

In one embodiment of the present invention, and referring now to FIG. 3, a method for determining how to forward a call from a calling party 12 to a called party 14 by way of the call forwarding system 10, the WAP gateway 18, and the device 15 is as follows:

The process begins when a calling party 12 places a call to a called party 14 at a telephone service provider 16, where the called party 14 subscribes to the call forwarding system 10 and has set the call forwarding system 10 to forward the call to the device 15 such as was set forth above (step 301). In the normal course, the call is routed to the telephone service provider 16 of the called party 14 (step 303), where it is noted that the called party 14 subscribes to the call forwarding system 10, perhaps by way of an appropriate AIN trigger attached to the line of the called party 14 and set off at an SSP 105 at the telephone service provider 16 (step 305). Accordingly, and in accordance with the call forwarding system 10, the SSP 105 issues a service request to an SCP 107 (step 307).

Here, the SCP 107 prior to returning call processing instructions to the SSP 105 checks with the destination station 15 to determine the availability thereof (step 309). In particular, and referring now to FIG. 3A, the SCP 107 signals to the WAP gateway 18 to access the destination station 15 (step 309a), and determine whether the call is to be accepted or rejected for forwarding (step 309b). Thus, the WAP gateway 18 attempts to establish a data connection with the WAP-enabled device 15 (step 309c). If not established, the device 15 is not on or is otherwise unavailable (step 309d) and a rejection determination is made. If established, the WAP gateway 18 and SCP 107 can by way of the data connection determine whether the device 15 wishes to answer or reject the forwarding call (step 309e), for example by way of a selection from options caused to be displayed by on a display screen 20 of the device 15. Thus, an answer or rejection determination is made, and the determination is communicated back to the SCP 107 (step 309f).

Figure 3:
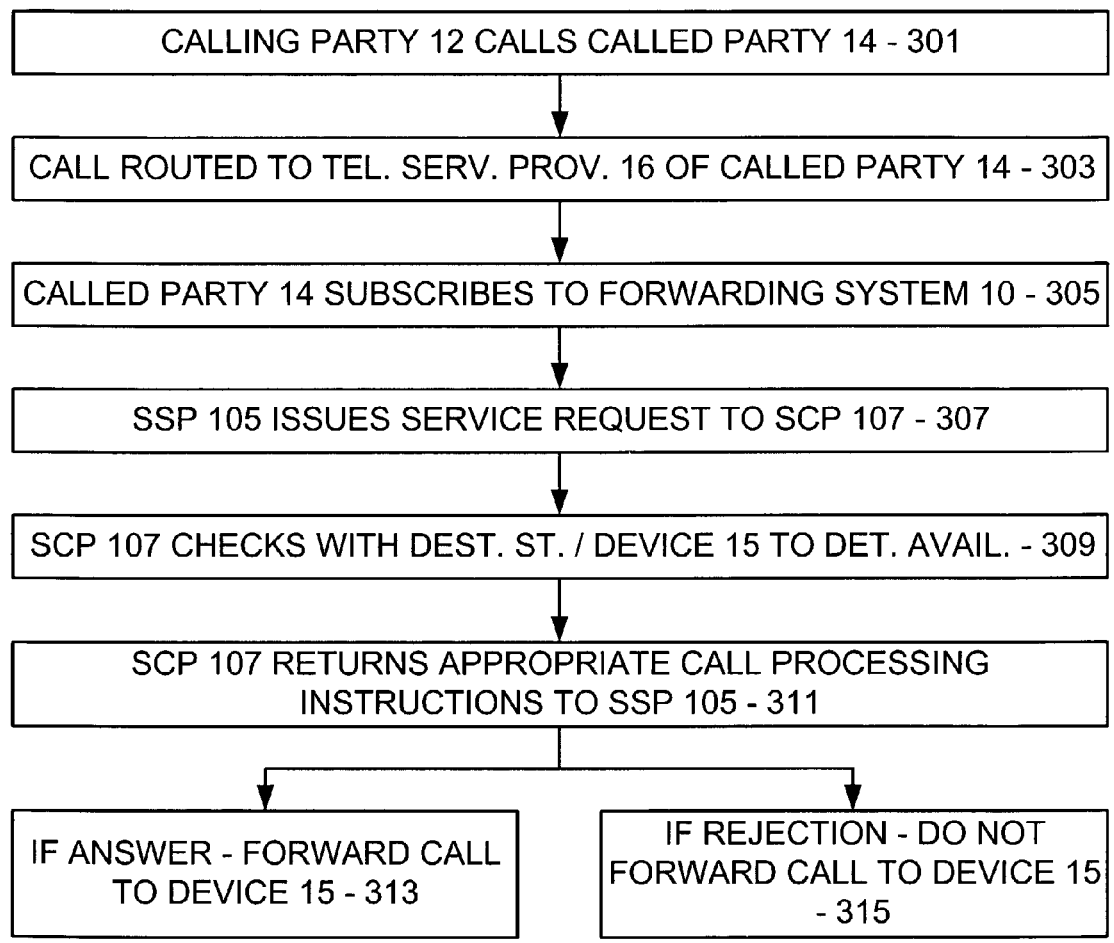
FIGS. 3 and 3A are flow diagrams showing steps performed in connection with the call from the calling party to the called party of FIG. 2.
Figure 3A:
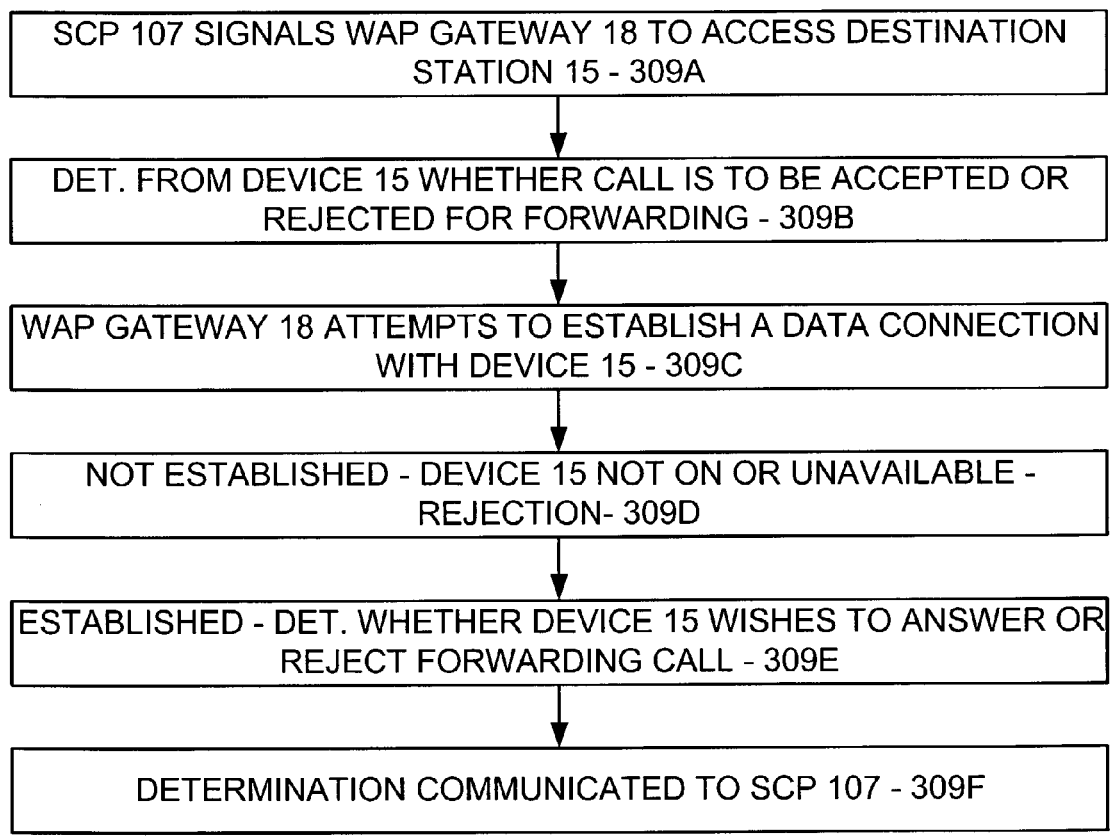

Thereafter, the SCP 107 returns appropriate call processing instructions to the SSP 105 (step 311, FIG. 3). In particular, if an answer determination is made, the SCP 107 instructs the SSP 105 and the call forwarding system 10 to forward the call to the device 15 (step 313), and if a rejection determination is made, the SCP 107 instructs the SSP 105 and the call forwarding system 10 to not forward the call to the device 15 (step 313) but to take an alternative action (step 315).

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful system 10 that forwards a call based on a determination beforehand of the status of the destination station 15. The system 10 first determines whether the destination station 15 is available, and only if so in fact forwards the call to such destination station 15. Thus, circuitous and costly routing of a call is avoided in the event the destination station 15 is not available to answer the call. It should be appreciated that changes could be made to the embodiments described above without departing from the inventive concepts thereof. Notably, the present invention is equally applicable to wire line and wireless telephone systems, and to routing within or between such wire line and wireless systems. It should be understood, therefore, that this invention is not limited to the particular embodiments disclosed, but it is intended to cover modifications within the spirit and scope of the present invention as defined by the appended claims.

The invention claimed is:

1. A call forwarding system implemented as a service to a called party by a telephone service provider of the called party, the called party wishing to have a call thereto from a calling party forwarded to a destination station, the call forwarding system including:

switching means for receiving the call from the calling party and in response thereto for issuing a request for call processing instructions;

control means for receiving the call processing instructions request and in response thereto for checking with the destination station to which the call is to be forwarded to determine the availability thereof; and determining means for determining, prior to forwarding the call, whether a user of the destination station to which the call is to be forwarded accepts or rejects the call that is to be forwarded, the determination whether a user of the destination station accepts or rejects the call being made even if the destination station is determined to be available, the control means returning call processing instructions to the switching means including a telephone number of the destination station if the destination station is available and the user of the destination station accepts the call, and the control means returning alternative call processing instructions to the switching means if the destination station is not available or the user of the destination station rejects the call.

2. The system of claim 1 at least partially implemented at a service switching point (SSP) or central office administered by the telephone service provider and a service control point (SCP) in an advanced intelligent network (AIN).

3. The system of claim 1 wherein the control means determines that the destination station is not available if not on or if on and busy.

4. The system of claim 1 wherein the destination station is a wireless device and further comprising a gateway through which the wireless device is accessed.

5. The system of claim 4 wherein the destination station is a wireless application protocol (WAP) enabled wireless device and wherein the gateway is a WAP gateway.

6. The system of claim 4 wherein the gateway in response to instructions received from the control means establishes a data connection with the wireless device and with the data connection determines the availability of the destination station, the gateway thereafter informing the control means of the determined availability.

7. A method of processing a call from a calling party to a called party subscribing to a call forwarding system, the called party wishing to have the call forwarded to a destination station, the method comprising the call forwarding system:

receiving the call from the calling party at a switching device;

in response to the received call the switching device issuing a request for call processing instructions to a control device;

receiving the call processing instructions request at the control device;

in response to the received request the control device checking with the destination station to which the call is to be forwarded to determine the availability of the destination station;

determining, prior to forwarding the call, whether a user of the destination station to which the call is to be forwarded accepts or rejects the call that is to be forwarded, the determination of whether a user of the destination station accepts or rejects the call being made even if the destination station is determined to be available;

returning by the control device call processing instructions to the switching device including a telephone number of the destination station if the destination station is available and the user of the destination station accepts the call; and returning by the control device alternative call processing instructions to the switching device if the destination station is not available or the user of the destination station rejects the call.

8. The method of claim 7 comprising receiving the call from the calling party at a service switching point (SSP) or central office, and in response to the received call the SSP issuing a request for call processing instructions to a service control point (SCP) in an advanced intelligent network (AIN).

9. The method of claim 7 comprising the control device determining that the destination station is not available if not on or if on and busy.

10. The method of claim 7 wherein the destination station is a wireless device and further comprising the control device checking with the wireless device to determine the availability thereof by way of a gateway through which the wireless device is accessed.

11. The method of claim 10 wherein the destination station is a wireless application protocol (WAP) enabled wireless device and wherein the gateway is a WAP gateway.

12. The method of claim 10 further comprising the gateway in response to instructions received from the control means establishing a data connection with the wireless device and with the data connection determining the availability of the destination station, the gateway thereafter informing the control device of the determined availability.

13. A call forwarding method implemented at least in part in an advanced intelligent network (AIN), the method comprising:

receiving a call from a calling party that is to be forwarded to a destination station;

checking with a destination station to which the call is to be forwarded to determine the availability of the destination station;

determining, prior to forwarding the call, whether a user of the destination station to which the call is to be forwarded accepts or rejects the call that is to be forwarded the determination of whether a user of the destination station accepts or rejects the call being made even if the destination station is determined to be available;

automatically forwarding the call to the destination station if the destination station is available and the user of the destination station accepts the call, wherein the call is not forwarded to the destination station if the destination station is unavailable or if the user of the destination station rejects the call.

14. The method of claim 13, wherein the call from the calling party is received at a service switching point (SSP) or central office of the AIN, the method further comprising in response to the received call, issuing by the SSP a request for call processing instructions to a service control point (SCP) in the AIN.

15. The method of claim 13, wherein when checking the availability of the destination station, the destination station will be unavailable if the destination station is not on or is on and busy.

16. The method of claim 13, wherein the destination station is a wireless device, and wherein checking the availability of the destination station is done by way of a gateway through which the wireless device is accessed.

17. The method of claim 16, wherein the destination station is a wireless application protocol (WAP) enabled wireless device and wherein the gateway is a WAP gateway.

18. The method of claim 16, further comprising establishing a data connection with the wireless device and determining, with the data connection, the availability of the destination station.

19. The method of claim 13, wherein determining whether a user of the destination station accepts or rejects the call that is to be forwarded comprises signaling the destination station and waiting for an answer indicating whether the user at the destination station wishes to receive the call.

20. The method of claim 19, wherein signaling the destination station comprises displaying options on a display screen of the destination station, wherein the answer can be indicated by the user selecting from among the options displayed on the display screen.

* * * * *